United States Patent
Sasaki et al.

[11] Patent Number: 5,926,445
[45] Date of Patent: Jul. 20, 1999

[54] WAVEFORM CONTROLLING DEVICE FOR A TRACKING ERROR SIGNAL

[75] Inventors: Takashi Sasaki; Kazuhiro Kiyoura; Alex Bradshaw; Koichiro Haraguchi; Takeshi Matsumoto; Tomoko Miyagawa; Hideaki Yoshimura, all of Kawagoe, Japan

[73] Assignee: Pioneer Electronic Corporation, Tokyo, Japan

[21] Appl. No.: 08/770,436

[22] Filed: Dec. 20, 1996

[30] Foreign Application Priority Data

Dec. 22, 1995 [JP] Japan .................. 7-335521

[51] Int. Cl.$^6$ .................. G11B 7/085
[52] U.S. Cl. .................. 369/44.25; 369/44.11; 369/44.23; 369/44.26; 369/44.28; 369/44.29; 369/44.32; 369/44.35; 702/66
[58] Field of Search .................. 364/487; 369/43, 369/44.11, 44.23–44.32, 44.35; 702/66

[56] References Cited

U.S. PATENT DOCUMENTS

| Re. 32,709 | 7/1988 | Ceshkovsky et al. | 369/44.26 |
|---|---|---|---|
| 4,855,983 | 8/1989 | Arai | 369/44.34 |
| 5,054,013 | 10/1991 | Kawamura | 369/44.28 |
| 5,181,195 | 1/1993 | Kume et al. | 369/44.41 |
| 5,212,675 | 5/1993 | Yoshino et al. | 369/44.36 |
| 5,247,501 | 9/1993 | Hashimoto et al. | 369/44.11 |
| 5,253,239 | 10/1993 | Edahiro et al. | 369/44.28 |
| 5,343,454 | 8/1994 | Watanabe et al. | 369/44.32 |
| 5,367,512 | 11/1994 | Satou et al. | 369/44.23 |
| 5,483,510 | 1/1996 | Ogino | 369/44.34 |
| 5,491,676 | 2/1996 | Yamaguchi et al. | 369/44.28 |
| 5,504,726 | 4/1996 | Semba | 369/44.28 |
| 5,629,911 | 5/1997 | Sasaki | 369/44.42 |
| 5,671,199 | 9/1997 | Nishikawa | 369/44.26 |

Primary Examiner—James P. Trammell
Assistant Examiner—Demetra R. Smith
Attorney, Agent, or Firm—Morgan, Lewis & Bockius LLP

[57] ABSTRACT

An unbalanced waveform of a tracking error signal is automatically corrected within a short period of time. A peak value and a bottom value of a tracking error signal are obtained by a peak-hold circuit and a bottom-hold circuit, respectively. Based on the peak value and the bottom value, an amount of offset measured from a reference level and an amplitude of the tracking error signal are computed. An adjustment value is computed for correcting the unbalance between the peak value and the bottom value based on the amount of offset and the amplitude of the tracking error signal. The adjustment value is fed back to a tracking balance circuit so that the waveform of the unbalanced waveform of the tracking error signal is corrected.

10 Claims, 8 Drawing Sheets

WAVEFORM CONTROLLING DEVICE FOR A TRACKING ERROR SIGNAL

BACKGROUND OF THE INVENTION

1. Field of the Invention

The present invention relates to a waveform controlling device for shaping the waveform of a tracking error signal used for a tracking servo control in which the irradiating position of a light beam is controlled to be placed on the position of an information track formed on an information recording medium.

2. Description of the Related Art

To optically reproduce information recorded on optical disks, a light beam must be focused onto an information track along which information is recorded, and the light beam irradiating position (light spot) must follow the information track. To this end, a focus servo control and a tracking servo control have been effected in a conventional optical disk reproduction device. The focus servo control uses a focus error signal produced from a light reflected from the optical disk and the tracking servo control uses a tracking error signal that is also produced from the reflected light from the optical disk.

Conventional tracking servo controlling methods include the 3-beam method and the push-pull method. The tracking error signal is produced when the light spot traverses the information track. FIG. 1(a) shows a waveform of the tracking error signal STE produced by the 3-beam or the push-pull method.

In effecting the tracking servo control using the tracking error signal STE, a distance of the light spot radially displaced from the information track is obtained from the tracking error signal STE, and then the position of an objective lens disposed in an optical path of the light beam is moved by means of an actuator toward the information track based on the thus obtained displaced distance of the light spot. In this manner, the radial position of the light spot is controlled typically, the waveform of the tracking error signal is symmetrical with respect to a reference level (zero level) when the light spot displaces the same distance in opposite radial directions relative to the information track.

However, this is not true in some cases with the conventional optical disk reproduction device. When the focus of the light spot is symmetrically undulating along the information track, although the tracking error signal must have a symmetrical waveform shape with respect to the zero level as shown by a dotted line in FIG. 1(b), the actual tracking error signal STE' have an asymmetrical waveform shape as shown by a solid line in FIG. 1(b). In this manner, even if the light spot is symmetrically tracking off from the information track, a tracking error signal having an asymmetrical waveform may be obtained. This is caused by the positional displacement of light emitting elements which produce a preceding beam and a post beam used for producing the tracking error signal in the 3-beam method or by the difference in the sensitivity of two photo-detectors for detecting the preceding and post beams. The light emitting elements are displaced by external vibrations imparted on the optical disk reproduction device. When the light emitting elements are positionally displaced, the light amount detecting capability of the corresponding photo-detectors does not longer remains the same. The sensitivity of the two optical detectors may become unequal due to aging. Particularly, vehicle-mounted compact disks (CDs) suffer from these causes.

When the tracking error signal is unbalanced, the tracking servo control cannot be accurately performed because a correspondence between the level of the tracking error signal and the amount of shift of the light spot from the information is shifted from that initially set.

It has been a general practice to correct the waveform of the tracking error signal using an oscilloscope when the unbalance of the tracking error signal is noted. Specifically, when the unbalance of the tracking error signal is found at the time of manufacture of the optical disk reproduction device, the correction of the tracking error signal is performed before shipment of the device. When the unbalance of the tracking error signal is found after shipment of the device, the device must be sent for repair. In either of the cases, it takes a long time to repair it, and it is particularly inconvenient for the user because of unavailability of the device during repair.

The correction of the tracking error signal has been done using a reference optical disk exclusively used for this purpose. Because this reference optical disk is not exactly the same as the optical disks subject to an actual use, the unbalance of the tracking error signal may be noted when the optical disks are reproduced even if the unbalance of the tracking error signal was corrected using the reference optical disk.

SUMMARY OF THE INVENTION

The present invention has been made to solve the aforementioned drawbacks accompanying the conventional optical disk reproduction devices. Accordingly, it is an object of the present invention to provide a waveform controlling device for a tracking error signal wherein an unbalance of a tracking error signal is automatically corrected within a very short period of time.

To achieve the above and other objects, there is provided a waveform controlling device for a tracking error signal, which includes a tracking error detection means, an offset computing means, an amplitude computing means, and a waveform shaping means. The tracking error detecting means detects a tracking error signal indicative of a displacement of a light spot irradiated onto an information recording medium from a position of an information track formed on the information recording medium. The tracking error signal has a waveform defined by a level changing between an upper limit value and a lower limit value. Also, the waveform has a reference level indicating that the light spot is irradiated on the position of the information track. The offset computing means computes, based on the upper limit value and the lower limit value of the tracking error signal, an amount of offset of the tracking error signal measured relative to the reference level. The amplitude computing means computes, based on the upper limit value and the lower limit value of the tracking error signal, an amplitude of the tracking error signal. The waveform shaping means performs waveform shaping of the tracking error signal based on the amount of offset and the amplitude of the tracking error signal so that an absolute value of the upper limit value and an absolute value of the lower limit value are equal to each other.

The waveform shaping means includes a storage means for storing an adjustment value for making the absolute value of the upper limit value and the absolute value of the lower limit value equal to each other. This adjustment value is used for a forthcoming waveform shaping by said waveform shaping means.

A moving means may further be provided for forcibly moving the light spot to traverse the information track.

The tracking error detecting means may detect the tracking error signal according to a 3-beam method or a push-pull method.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENT

A preferred embodiment of the present invention will be described with reference to the accompanying drawings. First, an optical disk reproduction device will be described while referring to FIGS. 2 through 4. The following embodiment employs a 3-beam method to produce a tracking error signal.

Figure 1A:
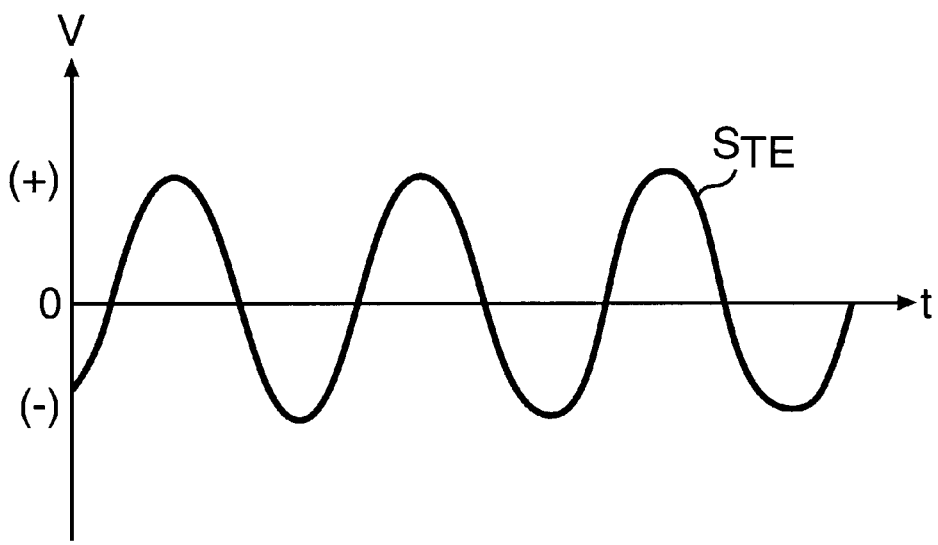
FIG. 1(a) is a waveform diagram showing a balanced tracking error signal.
Figure 1B:
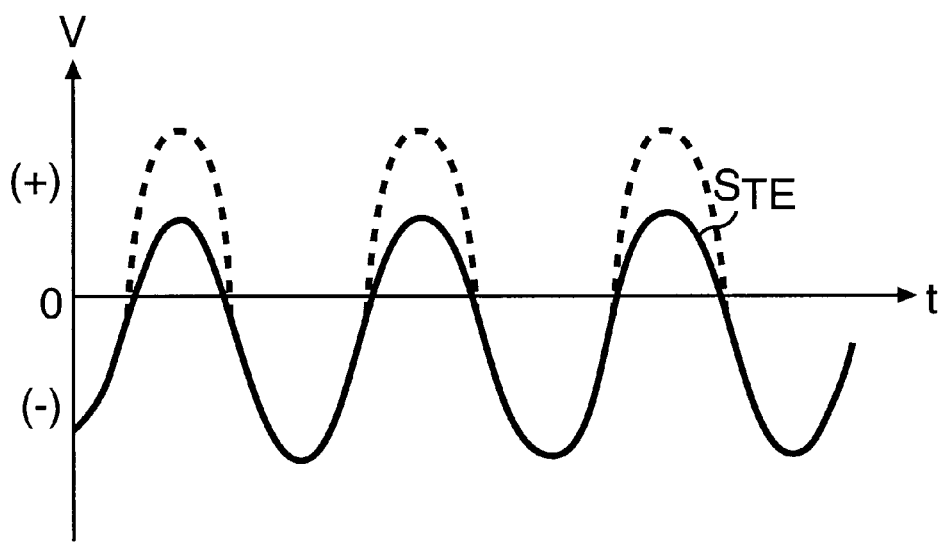
FIG. 1(b) is a waveform diagram showing an unbalanced tracking error signal.
Figure 2:
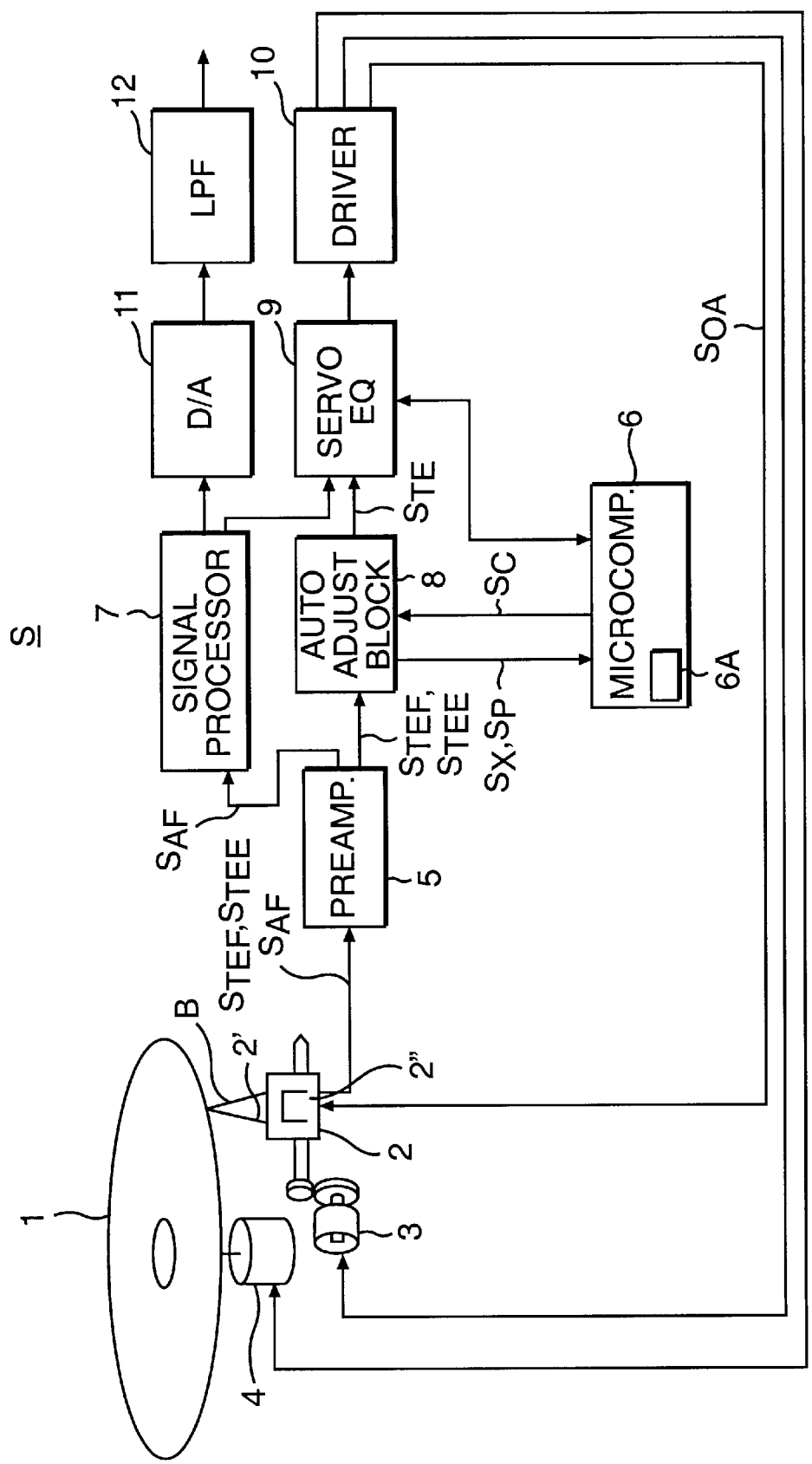
FIG. 2 is a block diagram showing an arrangement of an optical disk reproduction device according to one embodiment of the present invention.

FIG. 2 shows an arrangement of an optical disk reproduction device S according to the preferred embodiment of the present invention. The optical disk reproduction device S includes a pickup 2, a feed motor 3 for moving the pickup 2 in a radial direction of an optical disk 1, and a spindle motor 4 for rotating the optical disk 2 at a predetermined rotational speed. The pickup 2 irradiates light beams b onto the optical disk 1 and receives light beams reflected therefrom. Based on the light beams reflected from the optical disk 1, an electrical signal BRF corresponding to the information recorded on the optical disk 1 is produced together with a first detection signal STEF and a second detection signal STEE. The first detection signal STEF is produced based on an preceding beam and the second detection signal STEE is produced based on the post beam. Both the first and second detection signals are used for producing a tracking error signal STE according to the 3-beam method.

The reproduction device S further includes a preamplifier 5 connected to the output of the pickup 2, a signal processor 7 connected to the output of the preamplifier 5, a digital-to-analog (D/A) converter 11 connected to the output of the signal processor 7, and a low-pass filter (LPF) 12 connected to the output of the D/A converter 11.

The pre-amplifier 5 amplifies an electrical signal SRF, the first detection signal STEF and the second detection signal STEE which are output from the pickup 2. The amplified electrical signal SRF is sent to the signal processor 7 where it is subjected to an EFM (Eight to Fourteen Modulation) and an error correction by an error correction codes such as CIRC (Cross Interleave Reed-Solomon Code) and the resultant signal is sent to the D/A converter 11 and also to a servo equalizer 9 to be described later. The D/A converter 11 converts the digital signal sent from the signal processor 7 into analog signal SRF. The LPF 12 cancels noise components and allows the electrical analog SRF with an audible frequency range to pass therethrough.

The reproduction device S further includes an automatic adjusting block 8, the servo equalizer 9 having inputs connected to the signal processor 7 and the automatic adjusting block 8, and a driver 10 connected to the servo equalizer 9. The automatic adjusting block 8 receives the amplified detection signals STEF and STEE and generates a tracking error signal STE upon waveform shaping of these two detection signals. The servo equalizer 9 generates control signals for implementing a tracking servo control, a focus servo control, a spindle servo control and a carriage servo control based on the outputs from the signal processor 7 and the automatic adjusting block 8. The driver 10 amplifies and performs waveform shaping of the various control signals output from the servo equalizer 9, and outputs the resultant signals to the spindle motor 4, an actuator 2 for use in tracking control, the feed motor 3 and an actuator for use in the focus servo control (not shown).

The reproduction device S also includes a microcomputer 6 which performs waveform shaping of the tracking error signal and serves an an offset computing means for controlling an overall reproduction device S, an amplitude computing means, and a waveform shaping means. The microcomputer 6 is provided with a memory 6a which may be RAM (random access memory) for storing a waveform adjusting value used for the waveform shaping of the tracking error signal STE in the previous reproducing operation.

The actuator 2 includes an objective lens 2' for focusing the optical beam B onto the information track on the optical disk 1, an actuator 2" for driving the objective lens 2' in a direction perpendicular to the information track to perform the tracking control, and a photo-detector for receiving reflection light of the optical beam B from a reflection beam splitter, a quarter-waveform plate and the optical disk 1. The photo-detector includes not only a main detector for receiving the reflection light of the optical beam b used for reproduction of the information but also a preceding beam photo-detector for receiving the reflection light of the preceding beam and a post beam photo-detector for receiving the reflection light of the post beam.

Figure 3:
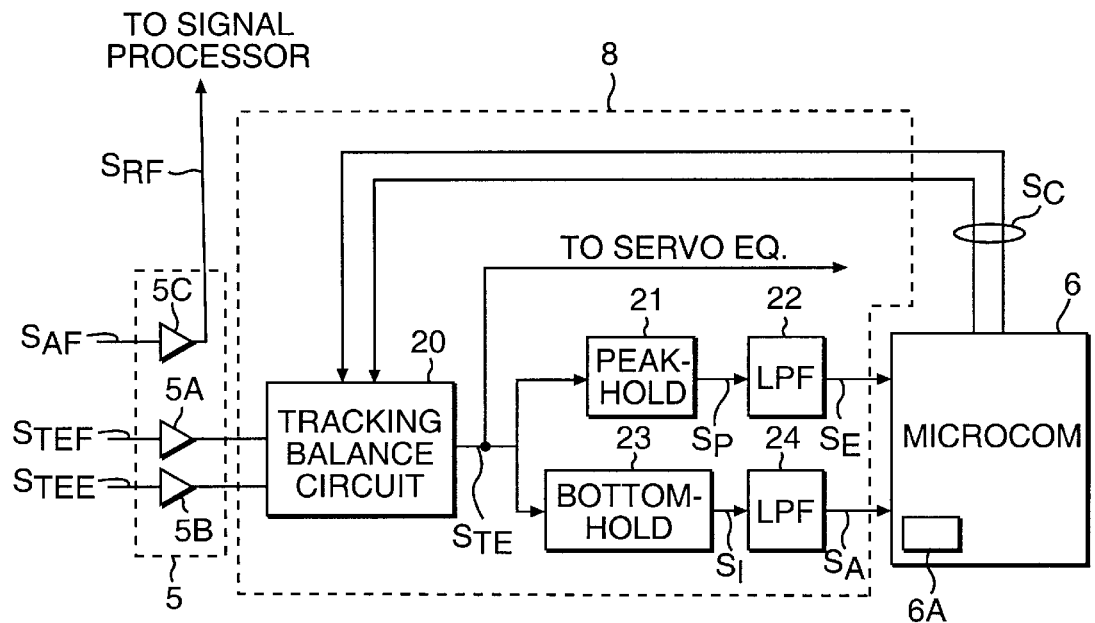
FIG. 3 is a block diagram showing an automatic adjusting block and its peripheral circuits.

Next, an arrangement of the pre-amplifier 5 and the automatic adjusting block 8 will be described while referring to FIG. 3. FIG. 3 shows only an arrangement pertaining to the waveform shaping of the tracking error signal STE and the reproduction of information, and other arrangements pertaining to focus servo control, spindle servo control and carriage servo control are dispensed with as they are similar in arrangements to those in the conventional art. As shown in FIG. 3, the pre-amplifier 5 includes a first pre-amplifier 5A for amplifying the first detection signal STEF output from the preceding beam photo-detector, a second preamplifier 5B for amplifying the second detection signal STEE output from the post beam photo-detector, and a third pre-amplifier 5C for amplifying the electrical signal SRF output from the main beam.

The automatic adjusting block 8 includes a tracking balance circuit 20 for waveform shaping of the amplified electrical signals STEF and STEE and generating a tracking error signal STE, a peak-hold circuit 21 for holding a peak value (the upper limit value in one cycle) of the tracking error signal STE and outputting the peak value signal SP, a LPF 22 for canceling high frequency noise components from the peak value signal SP thus output from the peak-hold circuit 21, a bottom-=hold circuit 23 for holding a bottom value (the lower limit value in one cycle) of the tracking error signal STE and outputting a bottom value signal SB, and an LPF 24 for canceling a high frequency noise component from the bottom value signal SB output from the bottom-hold circuit 23. To the tracking balance circuit 20 is applied a control signal SC from the microcomputer 6. The control signal SC is computed by the microcomputer 6 based on the peak value and the bottom value of the tracking error signal SPE which are obtained based on the peak value signal SP and the bottom value signal SB, respectively, for effecting a balance control of the tracking error signal STE.

Figure 4:
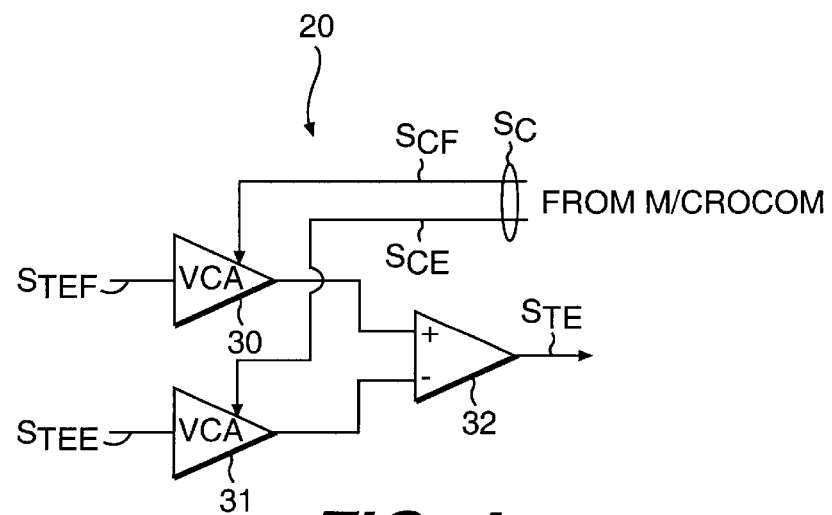
FIG. 4 is a block diagram showing a tracking balance circuit.

An arrangement of the tracking balance circuit 20 will be described while referring to FIG. 4. As shown in FIG. 4, the tracking balance circuit 20 includes a first VCA (Voltage Controlled Amplifier) 30 serving as a waveform shaping means, for amplifying the first detection signal STEF based on the control signal SCF contained in the control signals SC from the microcomputer 6, a second VCA 31 also serving as a waveform shaping means, for amplifying a second detection signal STEE based on the control signal SCE contained in the control signals SC from the microcomputer 6, and a differential amplifier 32 for generating the tracking error signal STE based on the detection signals STEF and STEE which have been subjecting to waveform shaping.

Referring next to the flowchart shown in FIG. 5, operating of the optical disk reproduction device S arranged as shown in FIGS. 2 through 4 will be described, particularly with respect to the waveform shaping process of the tracking error signal STE performed in the automatic adjusting block 8.

Figure 5:
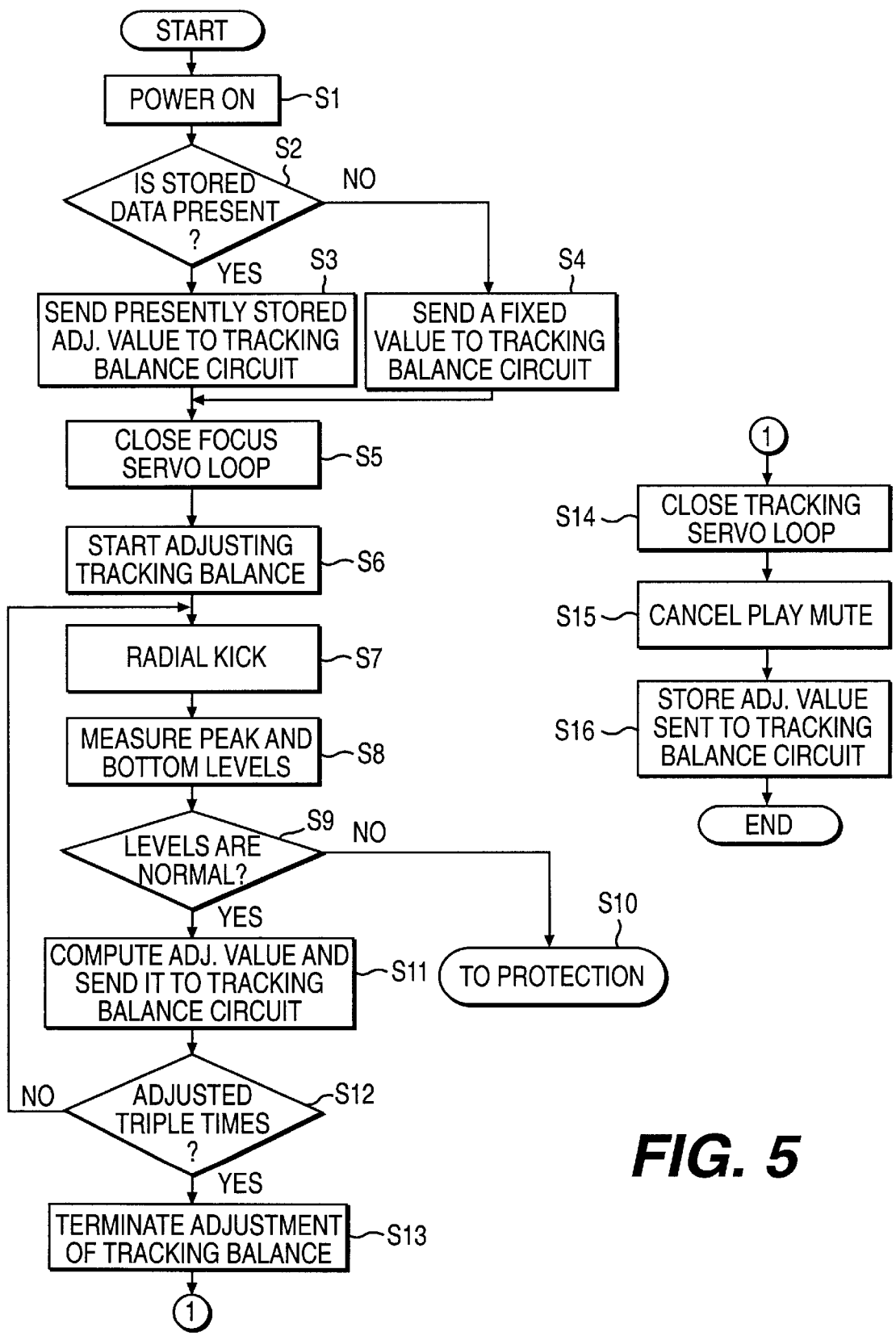
FIG. 5 is a flowchart illustrating an overall operation of the present embodiment including a waveform shaping process.

As shown in FIG. 5, when the optical disk reproduction devices is powered (step S1), it is checked whether or not the adjustment value used in the previous waveform shaping of the tracking error signal STE has been stored in the memory 6A (step S2). when the adjustment value is stored therein (step S2;YES), the value stored therein is output to the tracking balance circuit 20 as the control signal SC (step S3). On the other hand, when the adjustment value has not been stored in the memory 6A (step S2;NO), a predetermined adjustment value (original default value) is output to the tracking balance circuit 20 as a control signal SC (step S4).

In order to effect to focus servo control for focusing the optical beam b onto the information track of the optical disk 1, the optical disk 1 is rotated and the focus servo loop is closed by the operation of the servo equalizer which is controlled by the microcomputer 6 (step S5).

In order to carry out the waveform control process according to the present invention, various set values required for the process are set to the microcomputer 6 and the servo equalizer (step S6).

The so-called radial kick is carried out in which a light spot is forcibly moved in the radial direction of the optical disk 1 to generate the tracking error signal STE (step S7). This radial kick is carried out before moving the information track by the rotation of the optical disk 1. In the radial kick, the driver 10 outputs a driving signal SDA to the actuator 2 to drive the same based on the control signal from the servo equalizer 9. In response to the driving signal SDA, the actuator 2" is driven to forcibly move the objective lens 2' in the radial direction of the optical disk 1. The light spot is thus moved in the radial direction of the optical disk 1. The first and second detection signals STEF and STEE are generated by the optical spot that is forcibly traversed across the information track, and the tracking error signal STE is generated based on these detection signals. The radial kick is performed for the purpose of generating the tracking error signal STE within a short period of time in comparison with the case in which the tracking error signal STE is generated by the rotation of the optical disk 1. Based on the tracking error signal STE generated by the radial kick, the peak value and the bottom value of the tracking error signal STE are detected by the peak-hold circuit 21 and the bottom-hold circuit 23, respectively. The peak and bottom values thus detected are applied to the microcomputer 6 through LPFs 22 and 24 as the peak value signal SP and the bottom value signal SB (step S8).

Next, upon acknowledeging the peak value and bottom value, the microcomputer 6 checks if the level (the amplitude of the tracking error signal STE) of the signal is normal (step S9). In the normality checking procedure in step S9, when it is determined that the amplitude of the tracking error signal STE is too small (step S9; No), protection operations, such as unloading of the optical disk or error indication, are performed under the assumption that the optical disk 1, the pickup 2 or other circuitry is abnormal (step S10). The tracking error signal STE will not be determined as having an unduly high amplitude.

On the other hand, when the abnormality checking procedure in step S9 indicates that the amplitude of the tracking error signal STE is normal (step S9; Yes), an adjustment value is computed for the waveform shaping of the tracking error signal STE using the detected peak value and the bottom value, and the computed adjustment value is output to the tracking balance circuit 20 (step S11).

Figure 6:
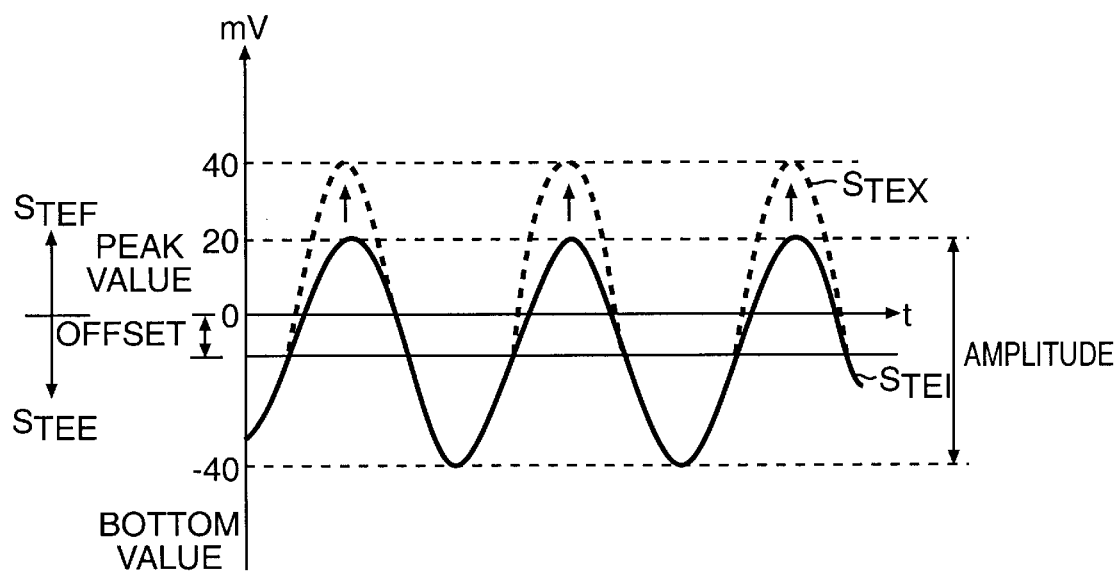
FIG. 6 is a waveform diagram illustrating a waveform shaping process.

Computation of the adjustment value performed in step S11 will be described while referring to FIG. 6. FIG. 6 shows an unbalanced tracking error signal STE1 (indicated by a solid line) and a balance corrected tracking error signal STE2 (indicated by a dotted line) obtained by correcting the unbalanced tracking error signal STE1 through the waveform shaping. In FIG. 6, the tracking error signal STE1 in portions existing above a reference level (zero level) is output from the differential amplifier 32 on the basis of the first detection signal STEF corresponding to the preceding beam whereas the tracking error signal STE1 in portions existing below the reference level is output from the differential amplifier 32 on the basis of the second detection signal STEE corresponding to the post beam. The unbalanced tracking error signal STE1 shown in FIG. 6 has a peak value of 20 mV and the bottom value of −40 mV.

In the process executed in step S11, the adjustment value is computed to determine an amplification factor of the VCA 30 which amplifies the first detection signal STEF so that the unbalanced tracking error signal STE1 indicated by the solid line is subjected to waveform shaping to provide a correct balance tracking error signal STE2 while canceling the offset. In the example shown in FIG. 6, the offset is −10 mV and the amplification factor of the VCA 30 is increased. The computation of the adjustment value is performed by the following equation based on the offset value and the amplitude of the tracking error signal STE1 shown in FIG. 6, if the previous value exists (step S3; Yes).

$$(\text{Adjustment value}) = (\text{Previous adjustment value}) + \alpha \times (\text{Offset})/(\text{Amplitude}) \quad (1)$$

where α is a predetermined constant set primarily based on the gain width characteristics of the respective VCAs. If the previous adjustment value doe snot exist (step S3; No), an original default value is used in the above equation in place of the previous adjustment value.

In the equation (1) above, the offset is given by the following equation:

$$(\text{Offset}) = \{(\text{Peak value}) + (\text{Bottom value})\}/2$$

where the bottom value has a sign opposite to that of the peak value.

The amplitude is given by:

$$(\text{Amplitude}) = (\text{Absolute value of the peak value}) + (\text{Absolute value of the bottom value})$$

Figure 7A:
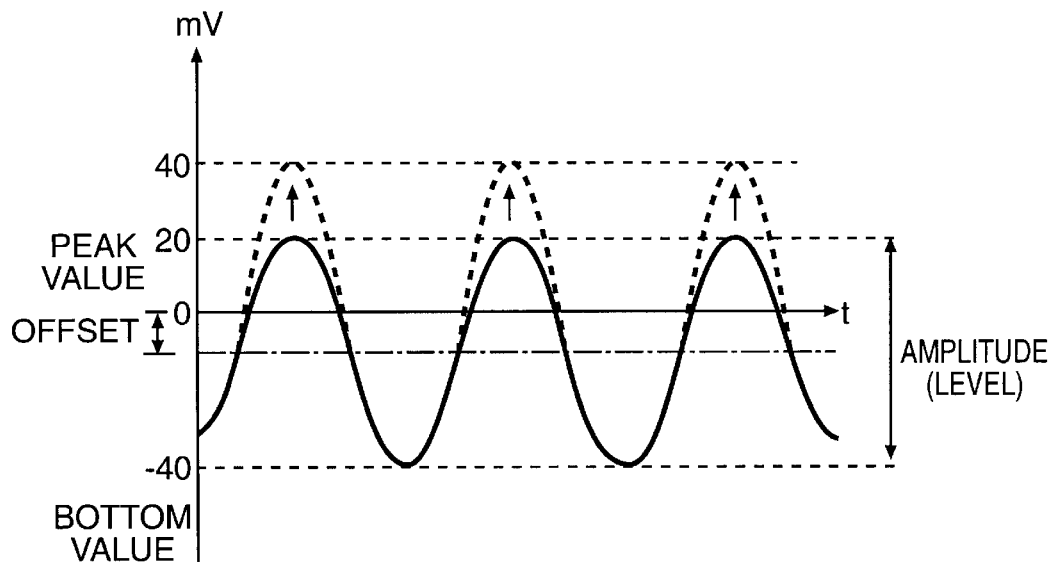
FIG. 7(a) is a waveform diagram illustrating a waveform shaping process for a tracking error signal having a large amplitude.
Figure 7B:
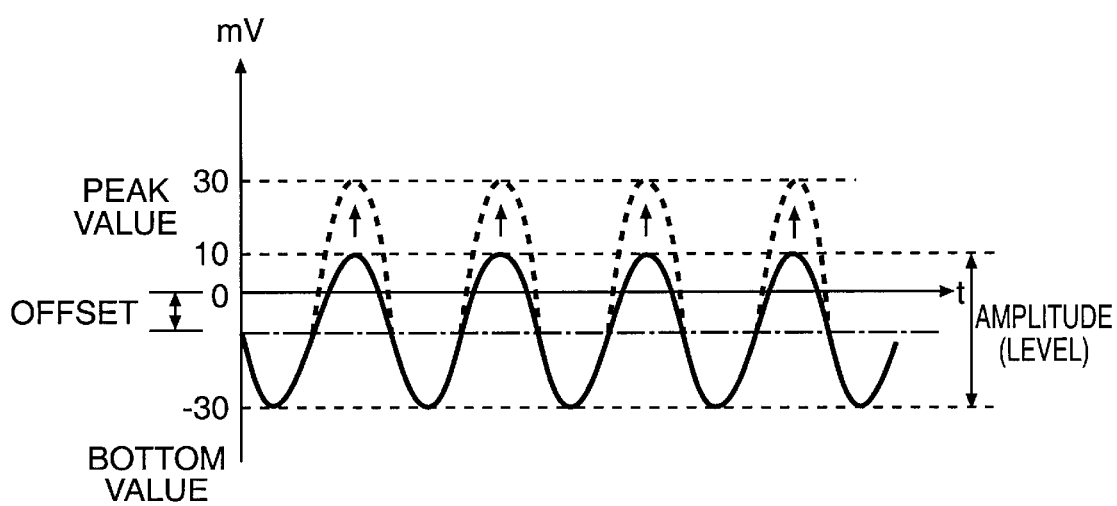
FIG. 7(b) is a waveform diagram illustrating a waveform shaping process for a tracking error signal having a small amplitude.
Figure 8:
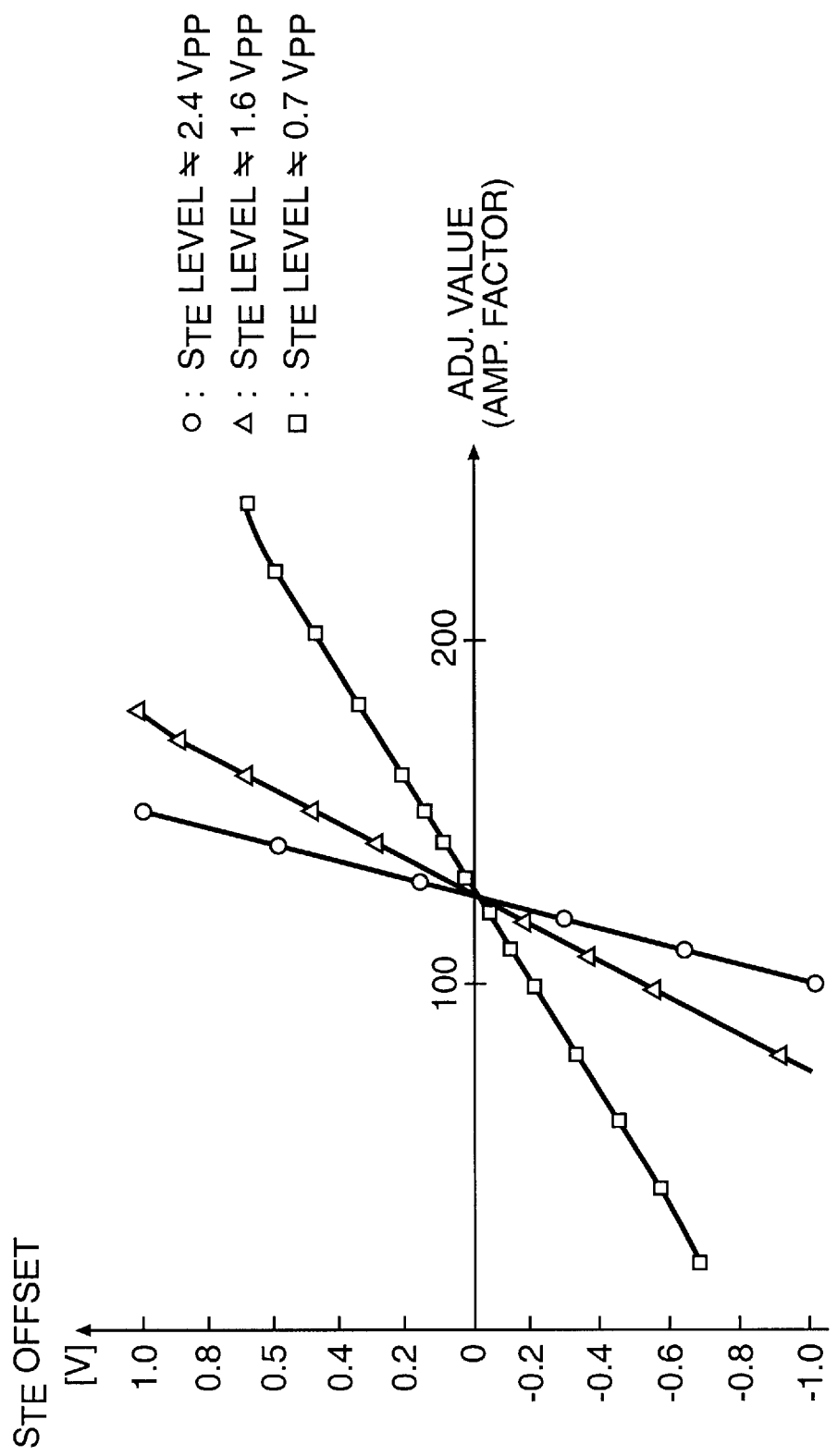
FIG. 8 is a graphical representation showing a relationship between an adjustment value and an offset in which the amplitude of the tracking error signal is not taken into account.
Figure 9:
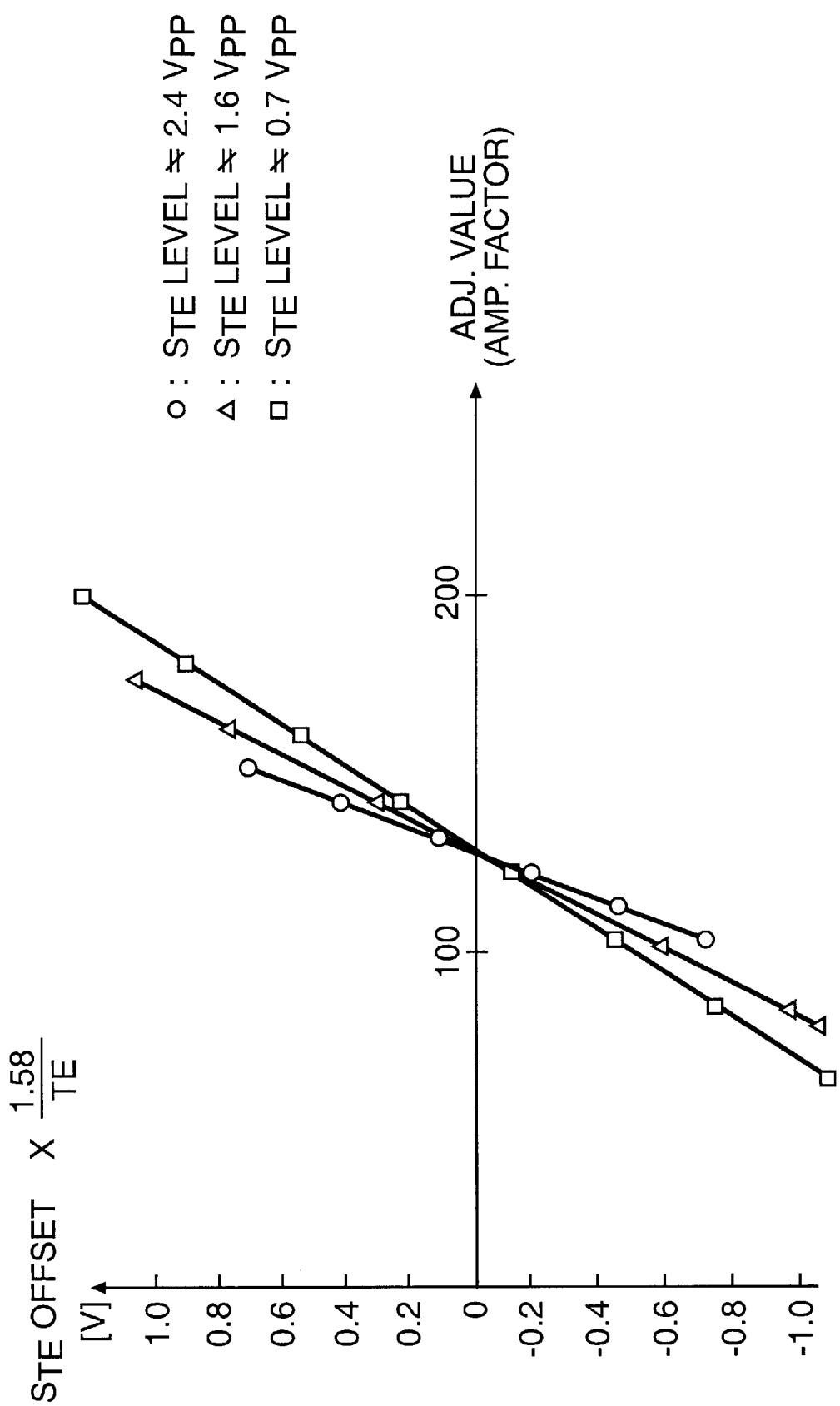
FIG. 9 is a graphical representation showing a relationship between an adjustment value and an offset in which the amplitude of the tracking error signal is taken into account.

FIGS. 7 through 9 are provided for explaining the reasons for taking the amplitude of the tracking error signal STE1 into account in the computation of the adjustment value. In FIG. 7(a), the solid line indicates the unbalanced tracking error signal with an offset value of −10 mV and the amplitude of 60 mV, and the dotted line indicates a correctly balanced tracking error signal. To obtain the balance corrected tracking error signal, the upper limit value of the unbalanced tracking error signal needs to be doubled.

On the other hand, in FIG. 7(b), the solid line indicates the unbalanced tracking error signal with the offset value of −10 mV and the amplitude of 40 mV, and the dotted line indicates the balance corrected tracking error signal. To obtain the balance corrected tracking error signal, the upper limit value of the unbalanced tracking error signal needs to be tripled.

As will be apparent from FIGS. 7(a) and 7(b), the amplification factor in the VCA differs in the tracking error signals having the same offset values but having different amplitudes. Accordingly, different adjustment values need to be provided for setting the amplification factors.

FIG. 8 shows experimental values on this issued. FIG. 8 is a graphical representation showing a relationship between the adjustment value on the axis of abecissas and the offset value of the tracking error signal STE on the axis of ordinates. When computing the adjustment value on the axis of abscissas, the amplitude and the tracking error signal is not taken into account. As can be appreciated from FIG. 8, if the amplitude of the tracking error signal is not taken into account when the adjustment value is computed, different adjustment values are obtained if the amplitude or level of the unbalanced tracking error signal is different even if the adjustment value is for correcting the same amount of offset value.

Next, consideration will be made with respect to the adjustment value computed while taking into account the amplitude of the tracking error signal to be waveform shaped as in equation (1). FIG. 9 shows experimental values. When the amplitude or the level of the tracking error signal is taken into account, the variation in the adjustment values for canceling the offset values is small as compared with the values indicated in FIG. 8. In view of this, when the adjustment value is computed while taking into account the amplitude of the tracking error signal, the offset of the tracking error signal can be canceled using an approximately constant adjustment value for the tracking error signal having different amplitudes. Therefore, an accurate waveform shaping of the tracking error signal can be accomplished.

Referring back to the flowchart shown in FIG. 5, when the adjustment values are computed for setting the amplification factors of the VCAs 30 and 31 based on equation (1) and the resultant values are output to the tracking balance circuit 20. In the latter circuit 20, the VCA 30 and 31 amplify the first and second detection signals STEF and STEE, respectively, with set amplification factors. Based on the amplified detection signals STEF and STEE, the differential amplifier 32 outputs a waveform shaped tracking error signal STE with balanced peak value and the bottom value.

Next, determination is made as to whether or not the waveform shaping process (steps S7 through S11) is carried out three times (step S12). This process is needed for improving the accuracy of the waveform shaping. When the waveform shaping process is not carried out three times (step S12; No), the routine returns to step S7 and the process in steps S7 through S11 are repeatedly carried out. When the waveform shaping process is carried out three times (step S12; yes), the servo equalizer 9 and the microcomputer 6 execute a process for terminating the waveform shaping process (step S13). In order to implement the tracking servo control based on the waveform shaped tracking error signal STE, the tracking servo loop is closed (step S14).

By canceling the play mute and outputting the electrical signal SRF to the signal processor 7, the tracking servo control, the focus servo control and other servo controls are implemented to start reproduction (step S15). The adjustment value computed in the process of steps S7 through S11 is stored in the memory 6A for the next reproduction process (step S16), whereupon the routine is ended.

As described above, according to the waveform controlling device of the present invention, the peak value and the bottom value of the tracking error signal are detected. Based on the peak value and the bottom value thus detected, an amount of offset measured from the reference level and an amplitude of the tracking error signal are computed. Then, an adjustment value for making the absolute values of the peak value and the bottom value equal to each other is computed based on the amount of offset and the amplitude of the tracking error signal. The adjustment value is fed back and the balance of the tracking error signal is corrected. Therefor, the unbalance in the waveform of the tracking error signal can be automatically corrected. Further, because the waveform of the tracking error signal is shaped while referring to the amplitude of the tracking error signal, an accurate waveform control can be attained. Accordingly, the tracking servo control can be implemented with high accuracy.

Further, because the waveform shaping is performed based on the peak value and the bottom value of the tracking error signal which can readily be obtained, the processes to be executed by the microcomputer are simplified and thus the execution can be attained at a high speed.

Furthermore, the waveform shaping of the tracking error signal is performed at a time when information is reproduced from the optical disk, the waveform shaping of the tracking error signal will cover the characteristic of the optical disk.

In the preferred embodiment of the invention, a radial kick is carried out to generate the tracking error signal by forcibly moving the light spot in the radial direction of the optical disk. Based on the tracking error signal thus generated, the waveform shaping is carried out. Therefore, the waveform shaping of the tracking error signal can be accomplished within a short period of time in comparison with the case in which the tracking error signal is generated by rotating the optical disk.

The current adjustment value is computed using the previous adjustment value. Therefore, in the computation of the current adjustment value, only a change in the adjustment value from the previous value ($\alpha \times$(Offset value)/(Amplitude)) may be computed. The computation is thus simplified and therefore can be executed at a high speed. The adjustment value is updated whenever the information is reproduced from the optical disk, the accuracy of the waveform shaping is improved.

While only one exemplary embodiment of the present invention has been described in detail, those skilled in the art will recognize that there are many possible modifications and variations which may be made in this exemplary embodiment yet retaining many of the novel features and advantages of the invention. Accordingly, all such modifications and variations are intended to be included within the scope of the appended claims.

For example, in lieu of the tracking servo control by 3-beam method, the present invention is applicable to a tracking servo control by a push-pull method. In the latter case, two divided detector outputs correspond to the first and second detection signals STEF and STEE in the 3-beam method as described. Thus, the waveform shaping process is implemented based on the two divided detector outputs.

Also, reproduction of information from the optical disk has been described, the present invention is also applicable to recording information on the optical disk by tracking a guide groove which has been formed in advance on the optical disk.

In the embodiment described above, the correction of the unbalanced waveform of the tracking error signal is repeatedly performed three times, however, the number of executions may be one or two times, or four times or more.

In the embodiment described above, correction of the waveform is performed with respect only to the portions of the waveform which are higher than the reference level. However, the lower level portions of the tracking error signal than the reference level may be corrected to provide a balanced waveform of the tracking error signal. Moreover, both the lower and the higher level portions of the tracking error signal may be corrected.

What is claimed is:

1. A waveform controlling device for a tracking error signal comprising:

tracking error detecting means for detecting a tracking error signal indicative of a displacement of a light spot irradiated onto an information recording medium relative to an information track formed on the information recording medium, the tracking error signal having a waveform defined by a level change between an upper limit value and a lower limit value, the waveform having a reference level indicating that the light spot is irradiated on the position of the information track;

offset computing means for computing an amount of offset of the tracking error signal relative to the reference level and based on the upper limit value and the lower limit value;

amplitude computing means for computing an amplitude of the tracking error signal based on the upper limit value and the lower value; and waveform shaping means for shaping the waveform of the tracking error signal based on the amount of offset and the amplitude of the tracking error signal, wherein an absolute value of the upper limit value is equal to an absolute value of the lower limit value.

2. The waveform controlling device according to claim 1, wherein the waveform shaping means includes storage means for storing an adjustment value for making the absolute value of the upper limit value equal to the absolute value of the lower limit value, the adjustment value being used for waveform shaping by the waveform shaping means.

3. The waveform controlling device according to claim 1, further including moving means for forcibly moving the light spot to traverse the information track.

4. The waveform controlling device according to claim 1, wherein the tracking error detecting means detects the tracking error signal according to a 3-beam method.

5. The waveform controlling device according to claim 1, wherein the tracking error detecting means detects the tracking error signal according to a push-pull method.

6. A method of tracking an information track on a recording medium comprising the steps of:

detecting a tracking error signal indicative of a displacement of a light spot irradiated onto an information recording medium relative to an information track formed on the information recording medium, the tracking error signal having a waveform defined by a level change between an upper limit value and a lower limit value, the waveform having a reference level indicating that the light spot is irradiated on the position of the information track;

calculating an amount of offset of the tracking error signal relative to the reference level and based on the upper limit value and the lower limit value;

calculating an amplitude of the tracking error signal based on the upper limit value and the lower value; and shaping the waveform of the tracking error signal based on the amount of offset and the amplitude of the tracking error signal, wherein an absolute value of the upper limit value is equal to an absolute value of the lower limit value.

7. The method according to claim 6, wherein the step of shaping the waveform uses a storage means for storing an adjustment value for making the absolute value of the upper limit value equal to the absolute value of the lower limit value, the adjustment value being used for the step of shaping the waveform.

8. The method according to claim 6, further including the step of forcibly moving the light spot to traverse the information track.

9. The method according to claim 6, wherein the step of detecting a tracking error signal detects the tracking error signal according to a 3-beam method.

10. The method according to claim 6, wherein the step of detecting a tracking error signal detects the tracking error signal according to a push-pull method.

* * * * *